W. C. AND F. E. WELLS.
FURNACE FOR CONVERTING ENERGY OF FUEL INTO FORCE.
APPLICATION FILED NOV. 15, 1915.
1,314,175.  Patented Aug. 26, 1919.
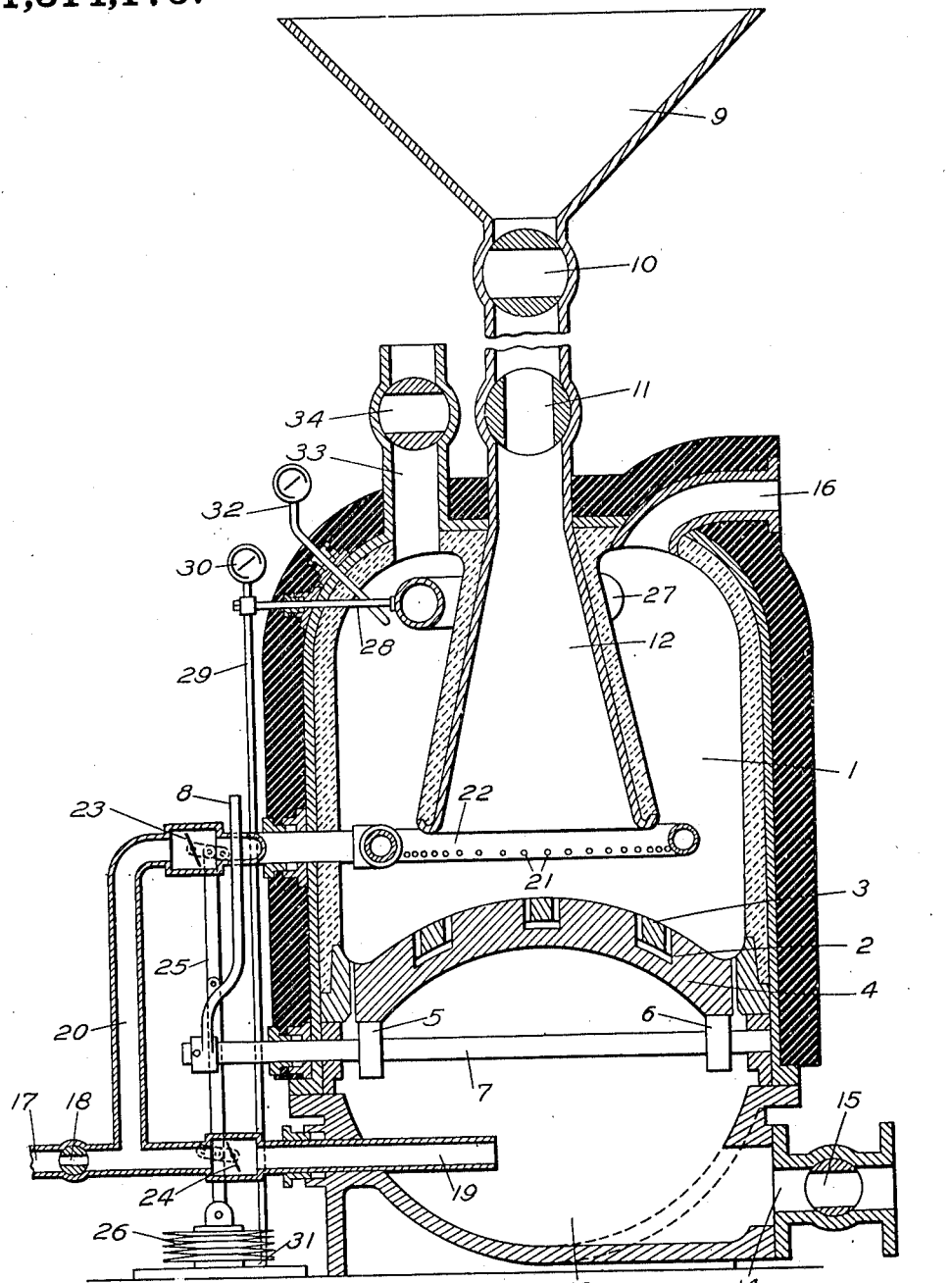

UNITED STATES PATENT OFFICE.

WILLET C. WELLS AND FRANK E. WELLS, OF COLUMBUS, OHIO.

FURNACE FOR CONVERTING ENERGY OF FUEL INTO FORCE.

1,314,175.  Specification of Letters Patent.  Patented Aug. 26, 1919.

Application filed November 15, 1915. Serial No. 61,706.

*To all whom it may concern:*

Be it known that we, WILLET C. WELLS and FRANK E. WELLS, citizens of the United States, residing at Columbus, in the county of Franklin and State of Ohio, have invented certain new and useful Improvements in Furnaces for Converting the Chemical Energy of Fuel into Mechanical Force, of which the following is a specification.

Our invention relates to a furnace for converting the chemical energy of fuel into mechanical force, wherein combustion is supported by compressed air introduced into the furnace and passing through the fuel in the form of furnace herein illustrated; into the gases or products of combustion we introduce a volume of compressed air which becomes diffused with said gases and is heated by the excess heat thereof, with the result that the whole volume of compressed heat-expanded and diffused gases in the furnace are brought to a uniform temperature without loss of heat energy. The maximum of efficiency of the gases of combustion is thus preserved, the excess heat thereof is utilized in expanding a body of compressed air diffused therewith, and means is provided for delivering the whole volume thereof to an appropriate motor. In our Patent No. 1,099,411, issued June 9, 1914, we have shown an apparatus for admitting to the furnace a body of compressed air under uniform pressure in variable volume to meet the requirements of the motor, so that the pressure within the furnace remains substantially uniform, and the apparatus described in that patent may be utilized in connection with the furnace herein described for maintaining a uniform pressure within the furnace.

The features of the furnace which is the subject of this application are:—automatically regulable means for admitting an appropriate volume of compressed air to support combustion, and to be expanded thereby, means for admitting a supplemental volume of compressed air into the gases of combustion to be diffused therewith, and to be expanded by the excess heat of said combustion, devices for automatically controlling the admission of the compressed air in such volumes as are required to utilize all the heat energy which the furnace is capable of producing, means for furnishing uniformly the desired quantity of fuel, and means for supplying natural draft for the initial firing.

Referring to the accompanying drawings which are hereto attached and hereby made a part of this specification, the figure is a vertical cross section of our apparatus which discloses the various features of the device.

In the drawings 1 is a furnace having the arch grate 2 composed preferably of the top piece 3 and the bottom piece 4, and arranged so that the bottom piece 4 may be raised and lowered through the cams 5 and 6 mounted on the shaft 7 and rocked by the lever 8, to agitate the fuel. The fuel is delivered to the grate through the hopper 9, valves 10 and 11, and magazine 12, the valves being manipulated to control the quantity of fuel as desired. The portion 13 of the furnace beneath the grate receives free air to support initial combustion through the opening 14 controlled by the valve 15. Egress from the furnace for the compressed heat-expanded gases for delivery to the proper motor is provided through the conduit 16.

Compressed air is admitted from an appropriate reservoir through the pipe 17 controlled by the valve 18 into the pipe 19, which delivers said air beneath the grate so that the volume of compressed air thus admitted passes upwardly through the body of the fuel to support the combustion thereof. The pipe 20 communicates with the pipe 17 and receives a supply of compressed air therefrom to be delivered through the perforations 21 into the furnace above the fuel in combustion, whereby said compressed air is diffused with the gases of combustion for the purpose hereinafter described.

Communication between the ring pipe 22 and the pipe 20 is controlled by the valve 23, and communication between the pipes 17 and 19 is controlled in a similar manner by the valve 24. Said valves 23 and 24 are controlled by the bar 25 communicating with the diaphragm 26, which is in turn controlled by the thermostat. In this instance the thermostat includes the closed circular tube 27 located within the furnace and near the top thereof and the tube 28 communicating therewith leading to the vertical tube 29 which at its upper end contains the indicator 30 and at its lower end at 31 communicates with the diaphragm 26. The connection between valves 23 and 24 is so arranged that as the diaphragm is expanded or contracted by the action of the thermostat both valves are actuated but in a contrary direction, and, consequently, when one of said valves is in its opening movement the other is in a closing movement, whereby the proper volume of compressed air to be admitted for supporting combustion or to be diffused with the gases of combustion is unerringly regulated and controlled.

A pyrometer 32 is provided at an appropriate point near the top of the furnace. The outlet 33 controlled by the valve 34 is provided to coöperate in permitting natural draft through opening 14 to bring the combustion to the proper stage for the utilization of the compressed air.

In operation the fuel magazine is filled and combustion is begun with the natural draft created through the openings 14 and 33; when the combustion has reached the proper stage the natural draft is shut off and compressed air is admitted through the pipe 19 beneath the grate and it passes up from the bed of fuel undergoing combustion and supports the combustion. Through pipe 20 and the perforations formed in ring 22 a supplemental volume of compressed air is admitted into the furnace above the grate and becomes diffused with the gases of combustion; the volume of compressed air thus admitted is raised to the desired temperature by the excess heat of the gases of combustion, whereby all of the heat energy of said gases is utilized and the resulting volume of compressed heat-expanded gases is of the temperature required for successful use for motive power purposes, and none of the heat energy has been wasted or lost.

The supply of compressed air being of substantially uniform pressure, however variable the volume required, it follows that the pressure within the furnace will be automatically sustained however variable the requirements therefrom.

The valves governing admission of com pressed air to the furnace are automatically controlled by the conditions which prevail within the furnace, through the thermostat, the diaphragm, and the rigid connecting means whereby the valves 23 and 24 are associated. We, therefore, provide a furnace in which pressure is maintained at a uniform degree, and combustion is supported. The use of compressed air to support combustion and to utilize the excess heat of the gases of combustion is controlled automatically so that the relation between the volumes of compressed air introduced for these two purposes is fixed by the terminal conditions existing within the furnace and is automatically controlled thereby.

What we claim is:—

1. A furnace having means for supplying fuel thereto, means for admitting compressed air to support combustion therein, and means for admitting compressed air to be expanded therein by heat in bringing the gases of combustion to a serviceable temperature, said temperature automatically controlling both said means of admitting said air.

2. A furnace having means for supplying fuel thereto, means for supplying compressed air to be expanded in supporting combustion therein, means for diffusing with the gases of said combustion a volume of compressed air to be expanded in tempering the heat thereof, and thermostatically controlled means whereby the supply of uniformly compressed air to the furnace is maintained in automatic relation to the requirements of heated compressed air from the furnace for power purposes.

3. A furnace having fuel supply means and provision for natural draft for initial firing of said fuel, means for introducing into said furnace compressed air to be expanded in supporting combustion, means for introducing a supplemental volume of compressed air into the gases of combustion, to be expanded by the excess heat of the products of said combustion, automatic means for controlling the admission of said portions of compressed air, said automatic means being regulated by the thermal conditions within the furnace.

In witness whereof I have hereunto subscribed my name at Columbus, Ohio, on this 11th day of November, 1915, in the presence of two witnesses.

WILLET C. WELLS.

Witnesses:
ALICE WILLCOX,
GEO. W. RIGHTMIRE.

In witness whereof I have hereunto subscribed my name at Jacksboro, Texas, on this 8th day of November, 1915, in the presence of two witnesses.

FRANK E. WELLS.

Witnesses:
WALTER ISBELL,
J. R. WILHELM.